United States Patent Office 2,867,082
Patented Jan. 6, 1959

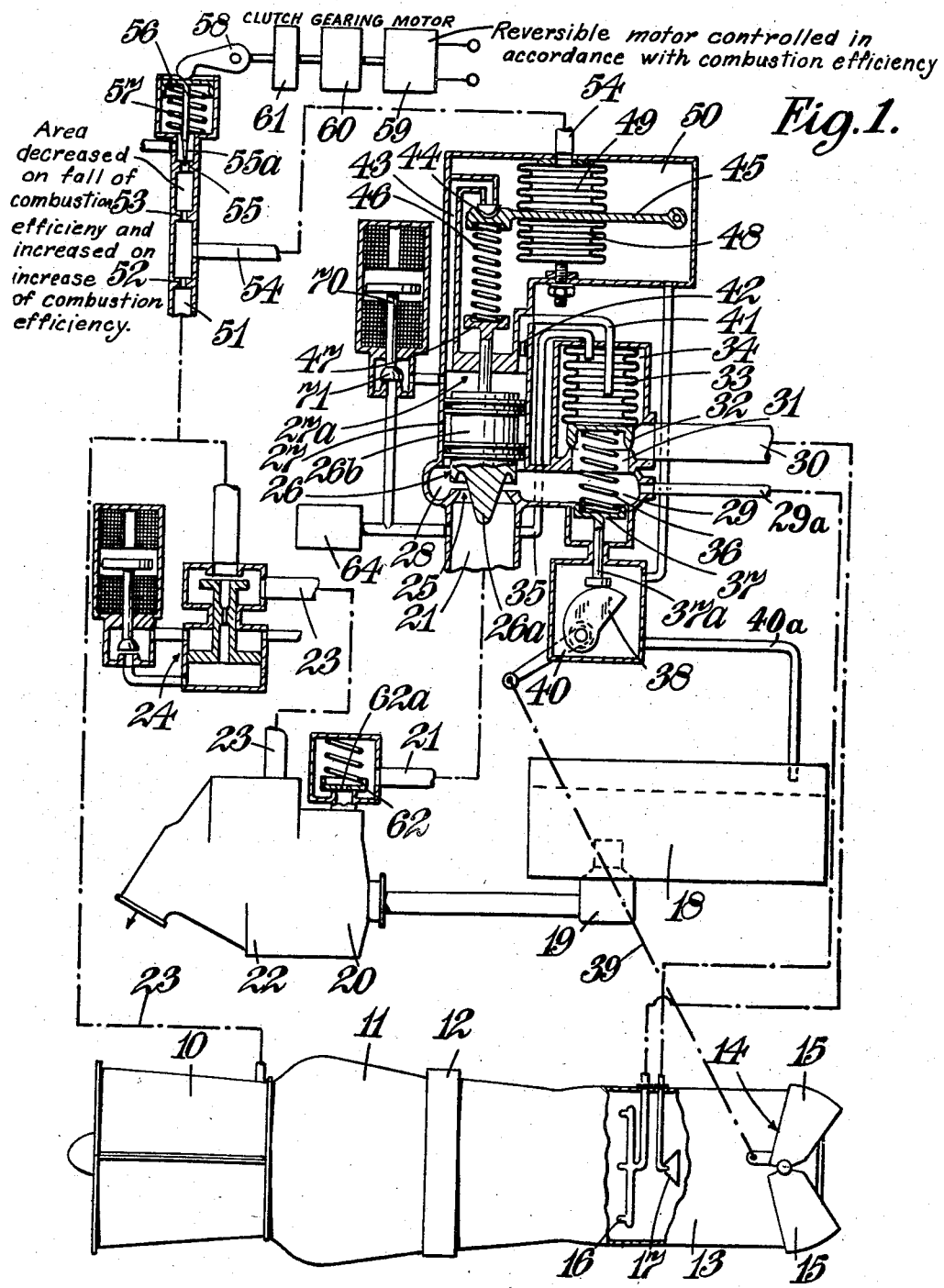

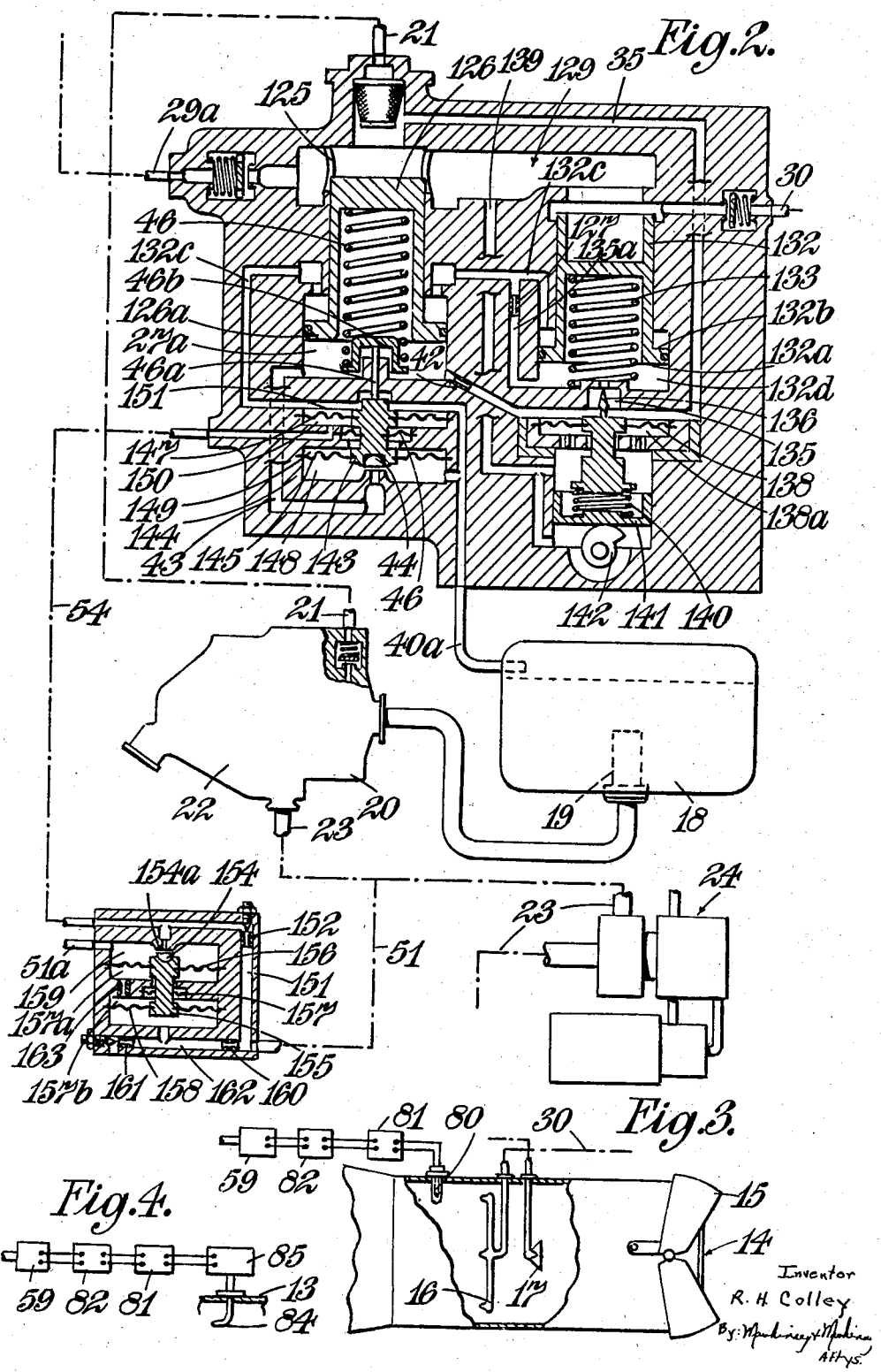

2,867,082

FUEL SUPPLY SYSTEM FOR GAS-TURBINE REHEAT COMBUSTION EQUIPMENT

Rowan Herbert Colley, Sunnyhill, Derby, England, assignor to Rolls-Royce Limited, Derby, England, a British company Application March 30, 1956, Serial No. 575,208

Claims priority, application Great Britain April 6, 1955

10 Claims. (Cl. 60—35.6)

This invention relates to fuel systems for jet-propulsion gas-turbine engines.

In some jet-propulsion gas-turbine engines provision is made for burning fuel in the working fluid after it has passed through the turbine in order to increase the power of the engine, and such engines comprise reheat combustion equipment supplied by a fuel system hereinafter referred to as a "reheat fuel system." The reheat combustion equipment usually comprises the jet pipe of the engine, and the jet pipe in such engines is usually provided with a variable-area jet nozzle which is operated to increase the outlet area when the reheat combustion equipment is operating. It is not usual to employ the reheat fuel system all the time that the power plant is operating, but only when an abnormally large power requirement is to be met. The reheat fuel system usually comprises main burners and at least one pilot burner, and it is usual for the pilot flame to be ignited before fuel is supplied through the main burners so as to ensure that, when this main fuel supply is injected, it is readily ignited and continues to burn.

The present invention has for an object to provide an improved control for the fuel supply to reheat burners.

It is desirable with an engine having reheat combustion equipment and a variable-area nozzle that the reheat fuel flow is closely correlated with the extent of nozzle opening, since if the fuel flow increases too slowly as the nozzle opens a fall of pressure occurs in the jet-pipe and flame extinction may occur, and since if the fuel flow decreases too slowly on closure of the nozzle damage to the nozzle structure may occur.

In order to avoid these difficulties, there is provided according to the present invention, a reheat fuel system for a jet-propulsion gas-turbine engine having reheat combustion equipment and a variable-area nozzle, which fuel system comprises reheat fuel burners and means to control the fuel supply to the reheat burners comprising a flow conduit conveying the fuel to the burners, and, in the conduit, a variable-area flow restrictor the effective area of which is controlled to increase and decrease as a function of and in the same sense as changes in the absolute compressor delivery pressure, and in series with the restrictor a throttle valve loaded in the sense of closure by a load which varies directly as the pressure drop across the restrictor and in the sense of opening by a second load which varies in the same sense as the effective area of the nozzle, whereby the pressure drop is controlled in accordance with the nozzle area.

With a reheat fuel system as just set forth, the rate of fuel flow past the restrictor responds rapidly to changes in the restriction of the restrictor, and thus to changes in the absolute compressor delivery pressure and nozzle area.

According to a preferred feature of the invention, there is provided means to apply the second load to the throttle valve which includes a mechanical linkage connected to the nozzle-area-varying elements to be adjusted simultaneously with movements of the elements.

Preferably the second load is arranged to be directly proportional to the square of the increase of area of the nozzle from its minimum area (i. e. non-reheat) position.

According to another preferred feature of the invention, in a fuel system having both main and pilot reheat fuel burners the variable-area flow restrictor is upstream of the throttle valve, and the pilot burner is fed with fuel from between the restrictor and the throttle valve.

In one preferred arrangement, the variable-area flow restrictor comprises a tapered plug valve co-operating with an orifice to vary the area of the orifice, and the valve is subjected in a sense to increase the area to the pressure in the flow conduit upstream of the orifice and in the sense to reduce the area to the pressure downstream of a restrictor in a bleed conduit which leads from the flow conduit upstream of the orifice to a vent valve, and the vent valve controls the flow in the bleed conduit and is loaded in the sense of closure through a spring in accordance with the extent of opening of the plug valve and in the sense of opening by the absolute compressor delivery pressure or a pressure derived from and varying with the absolute compressor delivery pressure. The throttle valve comprises a disc-like valve member which co-operates with a seating around an orifice, and which is carried by a capsule internally subjected to the pressure in the flow conduit upstream of the restrictor to urge the disc-like valve member on to its seating, and is urged away from its seating by a spring having a cam-displaced abutment, the cam being mechanically linked to the nozzle elements to increase the spring loading as the nozzle elements are adjusted to increase the nozzle outlet area.

According to another feature of this invention, there is provided means whereby the function connecting the absolute delivery pressure and the area of the variable-area flow restrictor may be varied, for instance to allow for changes in reheat combustion efficiency. This may be achieved in the preferred arrangement by applying the load to the vent valve through opposed equal-area capsules, of which one is evacuated and of which the other is connected to the compressor delivery through a branch conduit which is connected to between two restrictors in a tapping conduit leading from the compressor delivery, the flow through the tapping conduit being controlled by means responsive to the factor for which correction is desired. The two restrictors may be fixed-area restrictors and the flow varied by valve means downstream thereof, or the area of one of the restrictors may be varied. Where the factor for which correction is desired is combustion efficiency, a temperature- or pressure-responsive device may be provided in the jet-pipe upstream of the reheat combustion equipment and the device may be arranged to actuate through a reversible electric motor a cam which controls the flow through the bleed conduit.

There will now be described by way of example, and with reference to the accompanying drawings some forms of reheat fuel system according to this invention, for a gas-turbine jet-propulsion engine.

In the drawings,

Figure 1 illustrates diagrammatically a gas-turbine engine with reheat combustion equipment and a fuel system for supplying fuel to the reheat combustion equipment, Figure 2 illustrates a similar reheat fuel system to that illustrated in Figure 1 but with modified constructions of various parts of the reheat fuel system, Figure 3 illustrates a form of control which can be used in connection with the arrangements of Figure 1, and Figure 4 illustrates a further form of control which can be used with the arrangement of Figure 1.

The engine (Figure 1) comprises a compressor 10, main combustion equipment 11 connected to receive air delivered by the compressor and to have the fuel burned with the air therein, a turbine 12 receiving combustion products from the combustion equipment 11 and connected to drive the compressor 10, and exhaust means including a jet-pipe 13 receiving the exhaust gases from the turbine 12. The jet-pipe has at its outlet end a variable-area propulsion nozzle 14 including adjustable elements 15 for varying the nozzle outlet area.

The engine is also arranged for reheat operation by burning fuel in the exhaust gases flowing in the jet-pipe.

The reheat combustion equipment comprises a plurality of main fuel burners 16 arranged in the jet-pipe 13 and also at least one pilot fuel burner 17, and the fuel system for supplying fuel to the main and pilot burners is arranged so that fuel is delivered to the pilot burner 17 so long as fuel is delivered to the main burners 16.

The reheat fuel system comprises a fuel supply tank 18 from which fuel is delivered by a booster pump 19 to a high-speed centrifugal pump 20 which delivers it through a main pressure fuel pipe-line 21 towards the burners 16, 17.

The centrifugal fuel pump 20 is driven by an air turbine 22 for which the operating fluid is compressed air derived from the delivery of the compressor 10 through a duct 23 having fitted in it a shut-off cock 24 which is opened when it is desired to operate the reheat combustion equipment.

As will be well understood, the effective nozzle area of the propulsion nozzle is increased when the reheat combustion equipment is operating, and it is desirable, especially at high altitudes, to control the supply of fuel to the main burners 16 so that the rate of flow varies in accordance with the extent of opening of the propulsion nozzle. It is also desirable to ensure that if the effective nozzle area is changed the rate of fuel flow to the main burners is changed rapidly in accordance with the change in nozzle area, in order either to avoid damage to the nozzle elements due to overheating on reduction of the nozzle area, or to avoid such a fall of pressure within the jet-pipe as to cause extinction of the flame on increase of the nozzle area.

Moreover, it is desirable to maintain the delivery to the main reheat burners closely proportional to the mass flow through the engine.

It may also be desirable to control the fuel supply in accordance with variations in the reheat combustion efficiency.

The following arrangement is adopted in the present construction for effecting these controls.

The main pressure fuel pipe-line 21 (Figure 1) leads to a control mechanism the inlet to which is afforded by an orifice 25, the area of which is varied by means of a tapered plug valve 26. The plug valve is situated on the downstream side of the orifice and the portion 26a projecting through the orifice tapers in the upstream direction. The plug valve also has a portion 26b formed as a piston which works in a cylinder 27, the purpose of which will appear below.

The orifice 25 leads to a fuel gallery 28 connected with a fuel chamber 29 having an outlet leading to the main burner pressure fuel line 30, the outlet being in the form of a valve seating 31 with which co-operates a disc-like throttle valve member 32. The latter is carried by an expansible capsule 33 accommodated within a chamber 34 on the downstream side of the seating 31, and is so arranged that the valve 32 is subjected in the sense of opening to the pressure in the fuel chamber 29. The interior of the expansible capsule 33 is connected by a conduit 35 to the main pressure line 21 upstream of the orifice 25 so that the pressure within the expansible capsule is the pressure upstream of the orifice 25, and thus the disc's valve 32 is urged onto its seat by a load dependent upon the pressure drop across the orifice 25. Also the disc valve is urged in the sense to lift it off its seat by a spring 36 which has an adjustable abutment 37 the position of which is determined by a cam 38 rotatable by a mechanical linkage 39 connecting it with the nozzle elements 15 so as to be adjusted immediately on adjustment of the nozzle elements. The control mechanism unit is preferably located adjacent the upstream end of the jet pipe so that lost motion in the linkage 39 may be reduced to a minimum. It is arranged that as the nozzle elements move to increase the effective nozzle area the spring load tending to lift the disc valve is increased. As the elements 15 move to increase the nozzle area, the cam 38 turns anti-clockwise, and by suitably shaping the operative surface of the cam 38, the effective load of spring 36 is made to be directly proportional to the square of the increase of the effective area of the propulsion nozzle 14, and thus the pressure drop across the orifice 25 and the flow through it will be directly proportional to the increase of the area of the nozzle.

The adjustable abutment 37 may be carried on a rod 37a extending through the wall of the chamber 29 into a chamber 40 containing the cam 38 and containing fuel at tank pressure.

The interior of the capsule 33 carrying the disc valve 32 is connected by a second conduit 41 to the space 27a in the cylinder 27 remote from the tapered end of the plug valve 26 and this conduit (of which the inlet end is thus at the pressure upstream of the orifice 25) contains a restrictor 42. This cylinder space 27a has connected to it a bleed pipe 43 the outlet from which is controlled by a half-ball vent valve 44 and it will be clear that as the half-ball vent valve is opened, so the bleed flow from the space 27a will increase and the pressure within the cylinder space will decrease, and the plug valve 26 will move to increase the area of the orifice 25. Conversely, when the half-ball vent valve 44 closes, the pressure in the cylinder space 27a will increase and the plug valve 26 will be moved to decrease the effective area of the orifice 25.

There is also provided a connection between the main pressure line 21 upstream of the orifice 25 and the space 27a, this connection being controlled by valve 71. When the reheat system is inoperative this valve is open, and thus the pressure in space 27a is equal to that in line 21 and it is arranged that port 25 is closed. When the reheat system is operative, valve 71 is closed. Valve 71 is controlled by a solenoid 70.

The half-ball vent valve 44 is carried by a pivoted lever 45 which is subjected to two loads to control the position of the half-ball vent valve. The first load is applied by a spring 46 which tends to close the half-ball vent valve 44 on to the end of the bleed pipe 43 and which has an abutment 47 carried by the plug valve 26 so that the closing load depends upon the position of the plug valve, the load increasing as the effective area of the orifice 25 increases. The second load is applied by a pair of expansible capsules 48, 49, one 48 of which is evacuated and the other 49 of which contains air at a pressure dependent upon the delivery pressure of the compressor 10. The capsules 48, 49 are of equal effective area and so the load applied to the lever 45 by the capsules varies directly as the pressure dependent on the absolute compressor delivery pressure and the load is applied in the sense to open the half-ball vent valve 44. The lever and capsules are contained in a chamber 50 receiving the bleed flow from the cylinder space 27a and this chamber 50 is connected via the chamber 40 to the fuel reservoir 18.

The pressure within the second capsule 49 is derived as follows. A conduit 51 containing a pair of fixed-area restrictors 52, 53 in series is connected at its inlet end to the compressor delivery, and a branch conduit 54 is taken from this conduit 51 at a point between the two fixed restrictors to the interior of the capsule 49. It will thus be seen that the pressure within the capsule 49 will bear a predetermined relation to the compressor delivery pressure.

In operation, on increase of the compressor delivery pressure, the pressure within the capsule 49 increases correspondingly, opening the half-ball vent valve 44 so allowing an increased bleed from the cylinder 27 containing the plug valve 26, so that the plug valve moves to increase the effective area of the orifice 25. On such movement the load due to the spring 46 operating on the lever 45 increases and a steady position of the plug valve 26 will be reached when the loads due to the spring and capsules 48, 49, are balanced. Thus the effective area of the orifice 25 increases in a direct relation to the pressure within the second capsule 49.

It follows that since the area of the orifice 25 is determined in accordance with the absolute compressor delivery pressure and that since the pressure drop across the orifice is determined in accordance with the effective nozzle area of the propulsion nozzle 14, the flow through the orifice 25 and thus the flow to the burners will depend upon both these variables.

In order to vary the fuel supply in accordance with variations in the reheat combustion efficiency, it is preferably arranged that the relationship between the pressure in the second capsule 49 acting on the pivoted lever 45 and the compressor delivery pressure is varied. For this purpose there is provided in the conduit 51 leading from the compressor delivery at a position downstream of the two fixed restrictors, a third restrictor 55 of variable area and comprising an orifice and a needle valve 55a which varies the effective area. The needle valve is carried by a member 56 movable under control of a spring 57 and a control cam 58 which is driven by a reversible electric motor 59 through a reduction gear 60 and through an electrically-operated clutch 61 which is engaged when the reheat fuel system is operating. The electric motor 59 is controlled as to its direction of operation by a temperature- or pressure-responsive device which is located in the jet-pipe 13 of the engine at a position upstream of the reheat combustion equipment. On change of the combustion efficiency there is a change in the temperature and pressure in the jet-pipe upstream of the reheat combustion equipment and the departure of the value of the actual temperature or pressure from a selected value is employed to give the signal for controlling the operation of the electric motor. It will be appreciated that on decrease of the temperature or pressure, signifying a fall in combustion efficiency, the orifice 55 should be reduced in area, causing the pressure in branch conduit 54 to rise, so that an increase occurs in the supply of fuel to the burners, which tends to restore the temperature and pressure to the original value. This apparatus will have a relatively slow response time compared with that of the control mechanism 25—50, and thus "hunting" will be avoided.

In Figure 3, there is shown a temperature-responsive device 80, which may for example be a thermocouple or resistance thermometer, connected via a conventional form of electrical control 81, for instance a bridge circuit, and amplifier 82 to operate the motor 59. In Figure 4, there is shown a pressure-sensitive device comprising for example a Pitot tube 84 projecting into the jet pipe 13 and a pressure transducer 85 for converting pressure to an electrical signal which is fed to the control 81. Such pressure-sensitive and temperature-sensitive controls for a reversible motor are well-known.

The pilot burner 17 is connected to the chamber 29. It will be appreciated that on initiation of reheat combustion by actuation of solenoid 70 to close half-ball valve 71, thereby cutting off chamber 27a from direct communication with pipeline 21, the orifice 25 will open and fuel will be supplied to the pilot burner to provide a pilot flame. As the final nozzle opens so spring 36 will be compressed, and when the load due to this spring overcomes the load due to the pressure difference across orifice 25, the throttle valve will open and fuel will be supplied to the main burners 16.

If desired there may be provided in the main pressure fuel pipe-line a spring-loaded valve 62 which is arranged to open at a pressure in excess of the delivery pressure of the fuel system booster pump thereby to restrict the fuel flow into the pipeline 21 when the pump 20 is inoperative and the booster pump 19 is operative. This valve 62 may have a small bleed hold 62a leading through it to provide a small flow of fuel through the control mechanism so long as pump 19 is operative (pump 20 being inoperative), the flow occurring through conduits 21, 35 and 41, space 27a, pipe 43, chamber 50, and chamber 40 and then through return pipe 40a to the tank 18. This small flow of fuel effects cooling of the fuel control apparatus when the reheat equipment is inoperative.

There may also be provided a pressure-responsive switch 64 which is arranged for example to complete a circuit when the pressure in pipeline 21 rises to a preselected value on initiation of reheat combustion, to permit opening of the variable-area final nozzle 14.

In Figure 2, in which the same references are employed to indicate parts of the fuel system which are the same as in Figure 1, there are shown a number of possible modifications. The throttle member 132 is shown in Figure 2 formed as a piston which is loaded on one face, in the sense of opening, by the fuel pressure in chamber 129 (corresponding to chamber 29 on Figure 1), and is loaded on the other face by a servo-pressure, and in addition is loaded in the sense of closing by a spring 133. This piston is of stepped form having an enlarged portion 132a of which the servo-pressure acts, and an annular face 132b which is equal in area to the difference between the end faces and is connected to drain pressure through duct 132c and pipe 40a.

The servo-pressure is derived from the fuel in the main pressure pipe-line 21 by means of a branch conduit 135 from conduit 35, the branch conduit 135 containing a needle valve 136 and leads to the servo-pressure space 132d, the outlet duct 135a from the space containing a restrictor 137 to drain pressure duct 132c. As the needle valve 136 opens the servo pressure increases.

The needle valve 136 is connected to a diaphragm assembly 138 which is loaded in the sense to open the needle valve by the pressure in conduit 35, so that the pressure acting on the diaphragm assembly is the pressure upstream of the orifice 125, and which is loaded in the opposite sense by the pressure of the fuel in chamber 129, which is conveyed to a space 138a bounded by the diaphragm assembly 138 by means of a conduit 139. The last-mentioned space 138a also contains the spring 140 operated through an abutment 141 by cam 142 (corresponding to cam 38 on Figure 1), the operation being such that on opening of the final nozzle 14 the load of the spring 140 is increased, so as to tend to close the needle valve 136, decrease the servo pressure and cause valve 132 to open.

Also in this arrangement instead of using a tapered plug valve 26a as shown in Figure 1 of which the conical portion may be profiled so as to obtain a desired relation between valve movement and opening, the orifice is in the form of ports 125 which are uncovered by a cylindrical valve member 126 forming the smaller end of a stepped piston member, the shape of the ports being chosen to give the desired characteristic. The larger end 126a of the piston member is subjected (like piston 27 on Figure 1) to a pressure derived from conduit 35 through restrictor 42 and determined by vent valve 44.

Moreover, instead of the vent valve 44 being carried by a pivoted lever 45 (Figure 1), it is carried by a body 143 supported concentrically within a casing 144 by three circular flexible metal diaphragms 145, 146, 147, the diaphragms dividing the interior of the casing into four chambers 148, 149, 150, 151. The vent valve is situated in the lowermost chamber 148 and co-operates with the outlet of bleed duct 43, the chamber 148 being connected through drain pipe 40a to the fuel tank 18.

The uppermost and lowermost diaphragms 145, 147 are of equal area, and the uppermost chamber 151, which lies above the uppermost diaphragm 147 is also connected to drain through pipe 40a. The chamber 149 above the lowermost diaphragm 145 is evacuated, and the chamber 150 below the uppermost diaphragm 147 is connected to the branch conduit 54.

The load of spring 46 is transmitted to the diaphragm assembly by means of a pin 46a carried in a bush in the upper wall of the casing, the pin having a spring abutment 46b at one of its ends which projects into chamber 27a, and abutting the central body 143 of the diaphragm assembly at its other end.

An alternative means of varying the fuel supply in accordance with variations in the reheat combustion efficiency is shown in Figure 2, which avoids the use of an electric motor such as motor 59. In this form, the conduit 51 has in it a pair of restrictors 152, 153 in series, the upstream orifice 152 being of fixed area (though it may be adjustable manually for setting purposes) and the downstream orifice being afforded by a halfball valve 154 co-operating with a seating 154a. The branch conduit 54 is taken from a point between the restrictors.

The half-ball valve 154 is carried by a body 155 supported concentrically within a casing by three circular flexible metal diaphragms 156, 157, 158, the diaphragms dividing the interior of the casing into four chambers. The vent valve is situated in one end chamber 159 which is connected to the jet pipe of the engine upstream of the reheat combustion equipment via the downstream end 51a of conduit 51. One end diaphragm 156 is thus subjected to jet pipe pressure in the sense to increase the area of the orifice, and the other end diaphragm 158 is subjected in the opposite sense to the pressure between a pair of fixed-area restrictors 160, 161 (one at least of which may however be manually adjustable) in a conduit 162 which is branched off from conduit 51 and has its downstream end open to atmosphere. The two central chambers 157a, 157b are separated by the diaphragm 157 which has a smaller area than diaphragms 156, 158, and are interconnected through a restrictor 163; these chambers 157a and 157b are filled with a liquid for the purpose of damping movement of the diaphragm assembly.

It will thus be seen that the branch conduit 54 receives a pressure which is equal to the absolute compressor delivery pressure when the half-ball valve 154 is completely closed, and which is less than the compressor delivery pressure, when the valve is open, by an amount which is a fraction of the difference between the compressor delivery pressure and the jet pipe static pressure, the fraction being determined by the position of the half-ball valve 154 and thus by whether the jet pipe static pressure at any instant is greater or less than the pressure between the restrictors 160, 161 in the conduit 162 branched off from conduit 51.

Thus if the jet pipe static pressure is less than the desired proportion of the absolute compressor delivery pressure the half-ball valve tends to close, increasing the pressure in branch conduit 54, and vice versa.

The fuel scheduling unit and the modifications thereof as above described can be made to be extremely sensitive in response to variations in the compressor delivery pressure and to the area of the jet-propulsion nozzle, and not only will the control be sensitive but the controlling effect is a stable one due to the avoidance of "hunting."

The reheat control system above described is particularly suitable for aircraft flying in formation in which the thrust control is effected by varying the effective area of the propulsion nozzle 14.

I claim:

1. A reheat fuel system for a jet-propulsion gas-turbine having a compressor, a jet pipe, reheat combustion equipment in the jet pipe and a variable-area propelling nozzle, which fuel system comprises reheat fuel burners, a fuel supply conduit conveying fuel to said burners, upstream and downstream valves in flow series in said fuel conduit; the upstream valve comprising a first orifice, an adjustable valve element co-operating with said first orifice and adjustable to vary the effective area of said first orifice, a piston connected to adjust said valve element, said piston having a portion of a first face loaded by the fuel pressure in the fuel conduit upstream of said pair of valves in the sense to adjust the valve element to increase said effective area, a bleed conduit connected at one end to the fuel conduit upstream of the valves and having an outlet at its other end, a restrictor in said bleed conduit, a vent valve controlling the outlet of the bleed conduit, said piston having a second face loaded in the sense of reducing said effective area by the pressure in the bleed conduit between the restrictor and the vent valve, pressure-responsive means, means connected to the engine compressor and producing an air pressure which varies as a function of and in the same sense as changes in the absolute compressor delivery pressure, said pressure responsive means being connected to respond to said air pressure and being connected to load the vent valve in the sense of opening the vent valve on increase of said air pressure, and resilient means acting on said vent valve in the sense of closing the vent valve, said piston being connected to said resilient means and on movement varying the load applied by the resilient means to the vent valve in the sense of increasing the load as the valve element is moved by the piston to increase said effective area; and the downstream valve comprising a valve seating, a throttle valve member co-operating with said seating, and control means controlling the throttle valve member comprising a spring producing a load acting in the sense to increase the opening of the throttle valve member, an adjustable abutment for the spring, a linkage connecting the abutment with the variable-area propelling nozzle to adjust the abutment to increase the spring load as the area of the nozzle is increased, and second pressure-responsive means connected to respond to the pressure in the fuel conduit upstream of the upstream valve and producing a load which increases as the fuel pressure in said fuel conduit and opposes the spring load.

2. A reheat fuel system according to claim 1, comprising a cam engaging said adjustable abutment of the spring, said linkage connecting the cam to rock as the nozzle area is varied, said cam having an operative surface shaped and the cam being moved by the linkage so that as the nozzle area increases the load due to the spring increases in a direct proportion to the increase in said area.

3. A reheat fuel system according to claim 1, having both main and pilot fuel burners, said main burners receiving fuel from the fuel conduit downstream of the valves and the pilot burners being connected to the fuel conduit intermediate the valves to receive fuel therefrom.

4. A reheat fuel system as claimed in claim 1, wherein the downstream valve comprises a circular valve member which co-operates with said valve seating, the valve member being secured to an expansible bellows subjected internally to the fuel pressure in the fuel conduit upstream of the upstream valve in the sense to expand the bellows and urge the circular valve member towards its seating, said spring bearing by one end on the valve member and loading it in the opposite sense, the other end of the spring bearing against the adjustable abutment, a cam engaging the abutment, adjustable nozzle elements varying the nozzle area, the cam being mechanically linked on said linkage to the nozzle elements to increase the spring loading as the nozzle elements are adjusted to increase the nozzle outlet area.

5. A reheat fuel system as claimed in claim 1, said means connected to the engine compressor comprising means responsive to an operating condition in the jet pipe and operative to vary in accordance with changes in the operating condition the ratio of the absolute delivery pressure to the air pressure applied to the pressure responsive means loading the vent valve.

6. A reheat fuel system as claimed in claim 5, wherein the pressure responsive means loading the vent valve comprises opposed equal-area pressure-responsive bellows devices each of which bounds a chamber, one bellows device being evacuated and the second bellows device being connected to the compressor delivery by means including a tapping conduit leading from the compressor delivery, two restrictors in flow series in the tapping conduit, a branch conduit leading from between the restrictors to the interior of the second bellows device, and means responsive to an operating condition in the jet pipe and operative to vary the pressure in the branch conduit, thereby to vary the relation of the absolute delivery pressure of the compressor and the air pressure applied in the second bellows device.

7. A reheat fuel system as claimed in claim 6, said two restrictors in the tapping conduit being fixed-area restrictors, and comprising also valve means in the tapping conduit to vary the flow therein, said valve means being adjusted by said means responsive to said operating condition.

8. A reheat fuel system as claimed in claim 6, wherein one of said two restrictors in the tapping conduit is a variable-area restrictor and is connected to be adjusted by the means responsive to said operating condition to vary the flow in the tapping conduit.

9. A reheat fuel system as claimed in claim 5, wherein the means to vary the ratio of the absolute delivery pressure and the air pressure comprises a temperature-responsive device provided in the jet pipe upstream of the reheat combustion equipment.

10. A reheat fuel system as claimed in claim 5, wherein the means to vary the ratio of the absolute compressor delivery pressure and the air pressure comprises a device responsive to the pressure in the jet pipe upstream of the reheat combustion equipment.

References Cited in the file of this patent
UNITED STATES PATENTS

| | | |
|---|---|---|
| 2,668,416 | Lee | Feb. 2, 1954 |
| 2,742,755 | Davies et al. | Apr. 24, 1956 |
| 2,757,511 | Jagger | Aug. 7, 1956 |
| 2,774,215 | Mock et al. | Dec. 18, 1956 |